(No Model.)
J. P. BURNHAM.
TELESCOPIC JOINT FOR STEAM PIPES.
No. 553,509. Patented Jan. 28, 1896.
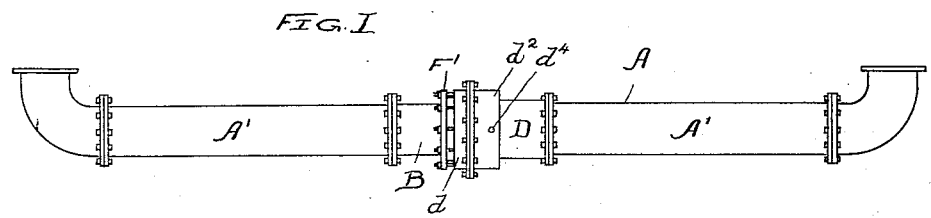
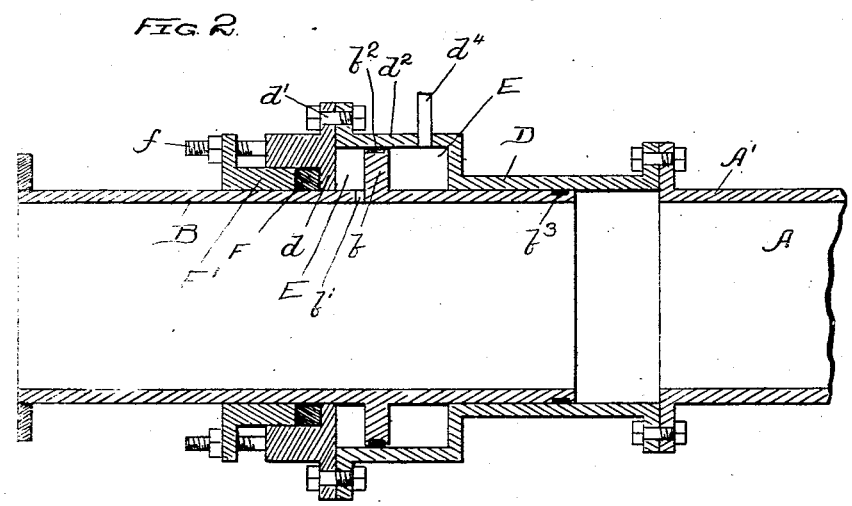
WITNESSES:
INVENTOR:
JOHN P. BURNHAM
BY Munday, Evarts & Adcock.
HIS ATTORNEYS.

UNITED STATES PATENT OFFICE.

JOHN P. BURNHAM, OF OAK PARK, ILLINOIS.

TELESCOPIC JOINT FOR STEAM-PIPES.

SPECIFICATION forming part of Letters Patent No. 553,509, dated January 28, 1896.

Application filed July 25, 1895. Serial No. 557,127. (No model.)

*To all whom it may concern:*

Be it known that I, JOHN P. BURNHAM, a citizen of the United States, residing at Oak Park, in the county of Cook and State of Illinois, have invented a new and useful Improvement in Expansion or Telescopic Joints for Steam-Pipes or other Pipes Containing Fluid under Pressure, of which the following is a specification.

My invention relates to improvements in expansion or telescope joints for steam-pipes or other pipes containing fluids under pressure.

Heretofore considerable difficulty has been experienced in the practical use of expansion or telescopic joints for steam-pipes owing to the tendency, especially in large pipes, of the steam-pressure to separate or force asunder the sections of the pipe at the telescopic joint, thus producing great strain upon the foundation or framework to which the separate sections are secured, and often occasioning serious injury.

The object of my invention is to provide an expansion or telescopic joint of a simple, durable, and efficient construction, that will be self-balanced, so that the pressure of the steam or other fluid in the pipe will not tend to force the sections asunder.

To this end my invention consists in providing the two telescopic sections or members of the joint each with a flange, collar, or ring, formed integral therewith or secured thereto, and of substantially the same area as the pipe, and together forming in connection with the pipe-sections a supplemental chamber which communicates with the interior of the pipe, so that the steam-pressure against these flanges, collars, or rings neutralizes or counteracts that against the interior of the pipe at the ends thereof.

In the accompanying drawings, forming a part of this specification, and in which similar letters of reference indicate like parts, Figure 1 is a side elevation of a steam or other pipe containing a telescopic or expansion joint embodying my invention, and Fig. 2 is an enlarged central longitudinal section.

In the drawings, A represents a steam-pipe, and B D are the two members or sections of the telescopic or expansible joint uniting the sections A' A' of the pipe A, the one pipe section or member fitting or telescoping within the other. The inner section or member, B, is provided with an external flange, ring, or collar $b$, preferably formed integrally therewith, and the end area of which substantially equals the area of the pipe A. The outer section or member, D, of the joint is provided with a flange, ring, or collar $d$, preferably formed in a separate piece, and secured to the end of the section D by bolts $d'$. The section D is also furnished at its end with an enlargement or bell $d^2$ to adapt it to surround the flange or collar $b$ on the inner section, B, and thus form in connection therewith and the ring or collar $d$ a supplemental annular steam-chamber E, the cross-sectional area of which equals, or should approximately equal, that of the pipe A. The supplemental steam-chamber E communicates with the interior of the pipe A through an opening $b'$ formed in the section B.

F is the packing, inserted between section B and the ring $d$ secured to the section D, for the purpose of making the joint steam-tight between the telescoping or sliding parts B D.

F' is the gland, adjustably secured to the ring $d$ by threaded bolts $f$, so that the packing F may be properly compressed.

The bell or enlargement $d^2$ of the outer section or member, D, is made long enough to permit the necessary or desired movement between the expansible or telescopic sections or members B D of the joint. The flange, collar, or ring $b$ on the section B is provided, or preferably provided, at its periphery with a packing-ring $b^2$, and a similar packing-ring $b^3$ is also preferably provided at the end of section B. To prevent compression of the air in or vapor leaking into the chamber E', formed by the bell or enlargement $d^2$, I provide a vent hole or opening $d^4$ through the bell $d^2$, thus making this chamber E' open to the atmosphere at all times.

As the end-thrust or pressure of the steam or other fluid in the pipe A against the section A' D, tending to separate it from the section A' B, is counteracted or compensated for by the pressure of the steam in the supplemental chamber E against the ring or collar $d$, which is of substantially equal area and which is secured to the section A' D, and as the like end-thrust or pressure against the section A' B is in like manner compensated for or equalized by the pressure of the steam in the supplemental chamber E against the flange or collar $b$ rigidly secured to the section B and of substantially equal area with the interior of the section A' B, it is obvious that the telescopic or expansion joint will be self-balanced, and that the pressure of the steam or other fluid in the pipe will not tend to force asunder the two members of the joint or at least will not exert any dangerous or injurious strain thereon. It is better to make the rings, flanges, or collars $b\ d$ secured to the opposing members B D of the joint substantially equal in area to the interior of the pipe A or the sections B D thereof, so that the pressure will be perfectly balanced; but it will be obvious to those skilled in the art that if these flanges, rings, or collars are made approximately equal in area to the pipe, or near enough so that injurious strain will be prevented, the practical results of my invention will be accomplished or in part accomplished, and I therefore do not wish to limit myself to the construction wherein the area of the flanges or collars $b\ d$ equals the area of the pipe A or its sections B D.

The supplemental steam or fluid chamber E communicating with the interior of the pipe is preferably annular in form and surrounding the pipe, and its relatively sliding or telescoping parts are likewise preferably annular in form, as shown in the drawings; but it will be readily understood by those skilled in the art that the principle of my invention is independent of the particular form or shape of the supplemental chamber and of the sliding or telescopic parts forming its walls, the essential thing being that the supplemental chamber shall have a communication with the interior of the pipe, and that one of its sliding or telescoping parts shall be secured to one section of the pipe and the other to the other section of the pipe, so that the pressure of the steam or fluid in the pipe tending to separate the sections thereof will be counteracted by the pressure of the steam or fluid in the supplemental chamber tending to separate in the contrary direction the sliding or telescoping parts forming the walls of this supplemental chamber.

I claim—

1. The expansible or telescopic joint for steam or other pipes, consisting in the combination with pipe section B, furnished with flange, collar or ring $b$, of pipe section D furnished with flange, collar or ring $d$, said flanges, collars or rings $b\ d$, in connection with said pipe sections B D forming a supplemental steam chamber E of substantially equal area in cross section to said pipe sections, said pipe section B having an opening $b'$ connecting said supplemental steam chamber with the interior of the pipe section, a packing F and a gland F', substantially as specified.

2. The expansible or telescopic joint for steam or other pipes, consisting in the combination with pipe section B, furnished with flange, collar or ring $b$, of pipe section D furnished with flange, collar or ring $d$, said flanges, collars or rings $b\ d$, in connection with said pipe sections B D forming a supplemental steam chamber E of substantially equal area in cross section to said pipe sections, said pipe section B having an opening $b'$ connecting said supplemental steam chamber with the interior of the pipe section, a packing F and a gland F', said section D having a bell or enlargement $d^2$, substantially as specified.

3. The expansible or telescopic joint for steam or other pipes, consisting in the combination with pipe section B, furnished with flange, collar or ring $b$, of pipe section D furnished with flange, collar or ring $d$, said flanges, collars or rings $b\ d$, in connection with said pipe sections B D forming a supplemental steam chamber E of substantially equal area in cross section to said pipe sections, said pipe section B having an opening $b'$ connecting said supplemental steam chamber with the interior of the pipe section, a packing F and a gland F', said section D having a bell or enlargement $d^2$, the supplemental chamber E' between said bell $d^2$ and the inner pipe section D having a vent or opening through the same, substantially as specified.

4. The expansible or telescopic joint for steam or other pipes, consisting in the combination with pipe section B, furnished with flange, collar or ring $b$, of pipe section D furnished with flange, collar or ring $d$, said flanges, collars or rings $b\ d$, in connection with said pipe sections B D forming a supplemental steam chamber E of substantially equal area in cross section to said pipe sections, said pipe section B having an opening $b'$ connecting said supplemental steam chamber with the interior of the pipe section, a packing F and a gland F', said section D having a bell or enlargement $d^2$, said section B having a packing ring $b^2$ at the periphery of said flange or collar $b$ and a packing ring $b^3$ near the end of said section, substantially as specified.

5. The expansible or telescoping joint for steam or other pipes, comprising in combination two telescopic sections or members, a supplemental steam chamber communicating with the interior of the pipe, substantially equal in area in cross section to the pipe, and having two relatively sliding or telescoping parts, one secured to one section of the pipe and the other to the other section of the pipe, to prevent the pressure of the fluid in the pipe from forcing the sections apart, substantially as specified.

JOHN P. BURNHAM.

Witnesses:
H. M. MUNDAY,
J. RICHARDSON.